(12) United States Patent
Zhuge et al.

(10) Patent No.: US 8,131,784 B1
(45) Date of Patent: Mar. 6, 2012

(54) MULTIPLE NODE QUOTA FILTER

(75) Inventors: John Zhuge, San Jose, CA (US); Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 957 days.

(21) Appl. No.: 11/862,136

(22) Filed: Sep. 26, 2007

(51) Int. Cl.
  *G06F 17/30* (2006.01)
(52) U.S. Cl. .................................................. 707/823
(58) Field of Classification Search .................. None
  See application file for complete search history.

(56) References Cited

U.S. PATENT DOCUMENTS

| | | | |
|---|---|---|---|
| 5,956,734 A * | 9/1999 | Schmuck et al. .............. | 1/1 |
| RE40,187 E | 3/2008 | Abraham et al. | |
| 7,406,473 B1 * | 7/2008 | Brassow et al. ............... | 1/1 |
| 7,487,228 B1 * | 2/2009 | Preslan et al. ................ | 709/219 |
| 7,555,482 B2 | 6/2009 | Korkus | |
| 2002/0133491 A1 * | 9/2002 | Sim et al. ..................... | 707/10 |
| 2003/0009484 A1 * | 1/2003 | Hamanaka et al. ........... | 707/200 |
| 2005/0044198 A1 * | 2/2005 | Okitsu et al. .................. | 709/223 |
| 2005/0203881 A1 | 9/2005 | Sakamoto et al. | |
| 2005/0226153 A1 | 10/2005 | Scifres et al. | |

OTHER PUBLICATIONS

Gud, Amit et al., "Elastic Quota File System (EQFS)," Department of D.Y. Patil College of Engg., Dec. 4, 2005, downloaded from http://people.cis.ksu.edu/~gud/docs/ppt/eqfs_ppt.pdf.
Leach, P. et al., "A Universally Unique Identifier (UUID) URN Namespace," The Internet Society, Jul. 2005, downloaded from Http://www.ietf.org/rfc/rfc4122.txt on Aug. 9, 2007.
"IT Value Card Published: Dec. 2005, Microsoft File Server Resource Manager," Microsoft Corporation, Dec. 2005.

* cited by examiner

*Primary Examiner* — Belinda Xue
(74) *Attorney, Agent, or Firm* — Blakely, Sokoloff, Taylor & Zafman LLP

(57) ABSTRACT

An apparatus and a method that allow a quota to be implemented over a data storage system having data associated with the user stored in multiple volumes or directories across multiple storage servers. The quota limits a user or a group of users to a defined amount (e.g., quota) of storage resources of the storage system. The method may include monitoring input-output (IO) data access requests on each of the multiple storage servers, for example, using a pluggable quota filter on each of the storage servers, determining a total usage of storage resources for a particular user over the multiple storage servers, and limiting the user to the quota over the multiple storage servers.

17 Claims, 6 Drawing Sheets

MULTIPLE NODE QUOTA FILTER

RELATED APPLICATIONS

This application is related to co-pending U.S. application Ser. No. 11/862,138, filed Sep. 26, 2007, entitled "Universal Quota Entry Identification," and co-pending U.S. application Ser. No. 11/862,140, filed Sep. 26, 2007, Issued U.S. Pat. No. 7,783,666 on Aug. 4, 2010, entitled "Access Quota Management," which are commonly assigned to the assignee of the present application.

TECHNICAL FIELD

This invention relates to the field of network data storage systems and, in particular, to quotas used in network data storage systems.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). A typical storage server manages one or more volumes storing data. A volume is a logical data set, or a logical data container, which is an abstraction of physical storage (e.g., disks) or parts thereof into a single logical storage object, and which is managed as a single administrative unit, such as by a file system layer. A volume may be defined from a larger group of available storage, such as an aggregate. A volume may be logically broken down into logical data sets (storage objects), which may contain one or more Redundant Array of Independent/Inexpensive Disks (RAID) groups. An aggregate is a logical aggregation of physical storage, such as a logical data container for a pool of storage, combining one or more physical mass storage devices (e.g., disks) or parts thereof into a single logical storage object, which contains or provides storage for one or more other logical data sets at a higher level of abstraction (e.g., volumes). A file system layer, which manages the underlying file system, is an application-level programmatic entity, which imposes a structure (e.g., hierarchical structure) on files, directors and/or other data contains stored and/or managed by a storage server, and which services read/write requests from clients of the storage server.

Storage administrators need a method to define and limit the amount of storage that is used by individuals who have access to a shared data storage resource. The administrator may wish to limit storage to particular individuals for administrative reasons, financial reasons, or the like. The administrators may also wish to control the rate of growth of data stored in the storage system. In order to limit the amount of storage used by an individual, some file systems, managed by the file system layer, have a quota of storage resources that can be used by a user to limit the storage usage by a user on a volume. A quota is a limit on the amount of storage resources that can be allocated to the user. There are different types of quotas, for example, usage quota, block quota, file quota, or inode quota. Usage and block quota limit the amount of disk area that can be used. File and inode quotas limit the number of files and directories that can be created. Specific quotas can be applied to individual users, or alternatively, a default user quota can be established that applies to all users utilizing space within the volume. An inode stores basic information about a file, directory, or file system object. Quotas may also be applied to a group of users in a similar manner as with individual users. That is, a system or storage administrator defines a usage or file quota specific to a certain user or group of users. Alternatively, quotas may be implemented for other entities than an individual user or a group of users, such as Human Resources (HR), Engineering, or the like. In addition, administrators typically define a warning level, i.e., a soft quota, at which users are informed they are nearing their limit, which is less than the effective limit, i.e., a hard quota. Also, there may be a grace interval, which allows users to temporarily violate their quotas by certain amounts if necessary. In defining and implementing quotas on storage server, an administrator can prevent one user from consuming an entire file system's resources, or create a system of tiered access, in which users can have different levels of restriction. This may be used, for example, to provide different levels of service based upon the needs of individual clients.

In conventional systems, quotas are specific to individual file systems. In particular, quotas are specific to a particular volume on a storage server, and are implemented on a per-volume basis. As such, in a storage system having multiple storage servers, should an administrator want to limit the usage of a specific user on more than one file system, a separate quota would have to be specified on each file system. This creates a problem for data storage system in which the administrator desires to limit the usage of a specific user to data stored over multiple storage servers. For example, in cluster and/or distributed environments, data associated with a particular user may be stored over multiple volumes across multiple nodes. Conventional storage systems that implement quota on a per-volume basis are inadequate to implement quota for these types of system, since a quota needs to be established for each volume. The problem with defining separate quotas for the same users on separate volumes is that each quota for each volume is fixed in order to have a fixed total quota. This fixed total quota is not flexible. For example, to have a 500 gigabyte (GB) quota on two volumes (e.g., volume 1 and volume 2) for a user, the conventional systems define a quota on each volume, such as 250 GB on volume 1 for the user, and 250 GB on volume 2 for the user; which is not what the administrator is wanting to achieve. The administrator would rather have a quota for the two volumes, not limiting the user to 250 GB on either volume, but to 500 GB total usage.

SUMMARY OF INVENTION

Described herein are an apparatus and a method for limiting the user to a quota of storage resources across multiple storage servers. The method may include monitoring input-output (IO) data access requests on each of the multiple storage servers to check for quota-sensitive data access requests. Based on the monitored IO data access requests, a total usage of storage resources is determined for a particular user across the multiple storage servers. The total usage of particular user can then be limited to the quota across the multiple storage servers.

BRIEF DESCRIPTION OF THE DRAWINGS

The present invention is illustrated by way of example, and not by way of limitation, in the figures of the accompanying drawings.

DETAILED DESCRIPTION

Figure 1:
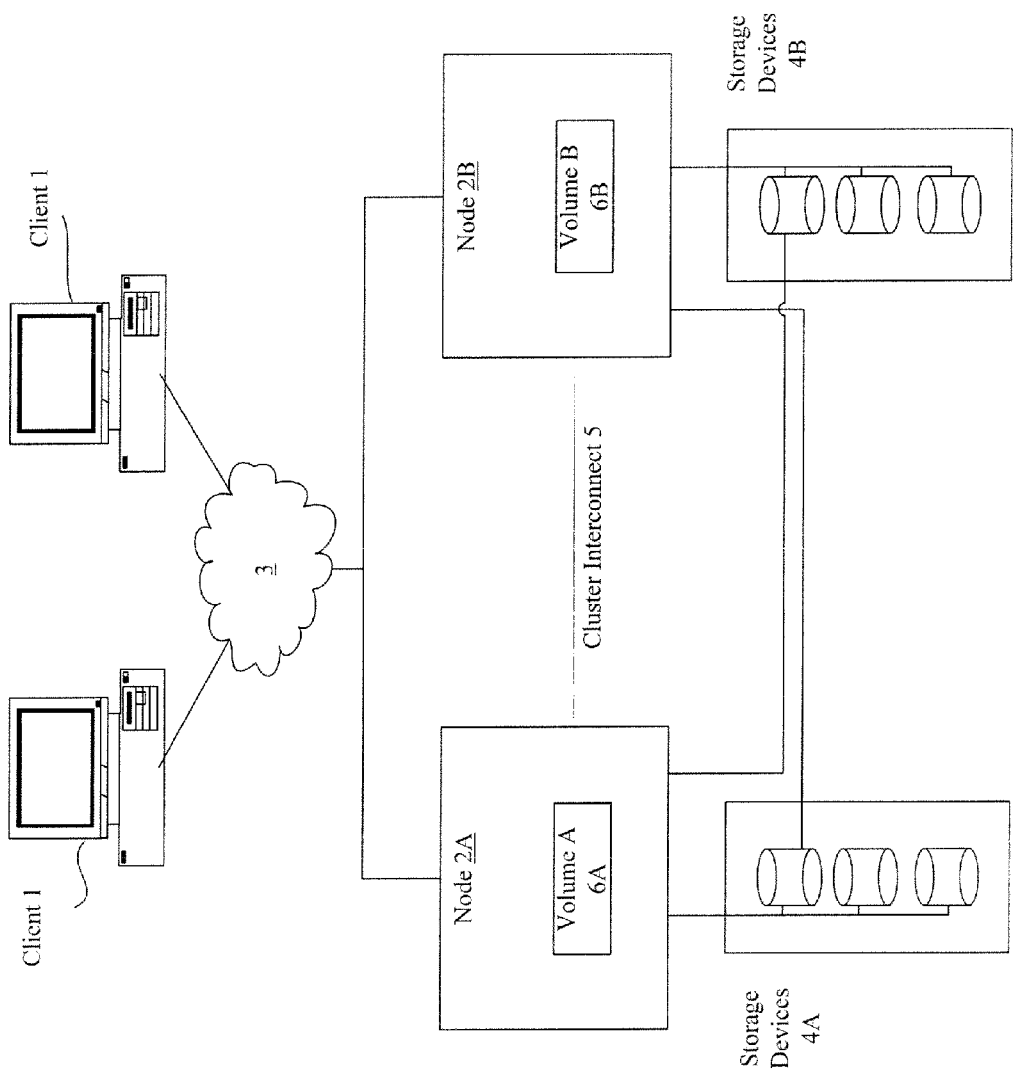
FIG. 1 illustrates a block diagram of one embodiment of an environment including a cluster configuration.

Described herein are apparatuses and methods that allow a quota to be implemented over a data storage system having data associated with the user stored in multiple storage servers. The quota limits a user or a group of users to a defined amount (e.g., quota) of storage resources (e.g., amount of disk space, number of files or directories, inode consumption, block consumption, or the like) of the storage system. The method may include monitoring input-output (IO) data access requests on each of the multiple storage servers, for example, using a pluggable quota filter on each of the storage servers. Based on the monitored IO data access requests, a total usage of storage resources is determined for a particular user over each of the multiple storage servers. The total usage of particular user can then be limited to the quota across the multiple storage servers by comparing the total usage against the defined quota. The quota may be implemented over multiple volumes across multiple storage servers. The quota may be implemented using a pluggable quota filter, for example, a protocol layer filter. The quota filter may be implemented in a storage server having a filter framework that handles request and response calls to quota filters that are registered with the filter framework, as described in more detail below. The quota filter communicates with a quota database manager. The quota may be implemented as a volume quota over multiple volumes on a single node or across multiple nodes. The quota may also be implemented as a directory quota over multiple directories on a single node or across multiple nodes.

A quota database manager can be implemented on another node (e.g., an additional storage server), or alternatively, on one of the nodes (e.g., storage servers) of the storage system, to manage a quota policy database. The quota policy database may include a quota database (e.g., quota database 42) that stores entries of runtime usage for one or more users or groups of users, and a quota configuration database (e.g., quota configuration database 43) that stores entries of the quota limits for one or more users or groups of users. It should be noted that although the embodiments described herein are described as implementing the quota in a quota database and a quota configuration database that is managed by a quota database manager, the quota may also be implemented in other types of data stores as known to those of ordinary skill in the art. Each node in the storage system can access the same quota database, which is managed by the quota database. In one embodiment, the quota database may be a server implementing the Data ONTAP® GX operating system, available from Network Appliance of Sunnyvale, Calif., to implement a relational database (RDB). Alternatively, other types of devices may be used.

The quota filter sits in the data path of a storage server, and can calculate block and/or inode consumption across volumes for a given volume set. By monitoring the quota-sensitive data access requests, the quota filter can determine the total usage of storage resources for the particular volume, and update the quota database. By accessing the quota database by each of the storage servers, the total usage for the user on the entire storage system can be determined and compared against the quota, as defined by a quota policy. This allows the user to be limited to the quota, such as by denying access for the current IO data access request requested by the user on the client.

A volume set is a group of volumes in the same node or across different nodes. Similarly, the quota filter can calculate block and/or inode consumption across multiple directories for a given directory set. A directory set is a group of directories in the same node or across different nodes. Alternatively, the quota filter can use local quota accounting on each of the volumes. The quota filter can support both soft quota and hard quota. The embodiments described herein can set up quota for a user over multiple volumes and across multiple, similar or dissimilar nodes.

In operation, the quota filter monitors data access requests from the client 1 to check for quota-sensitive data access requests against quota for the given user or group. Examples of quota-sensitive data access requests may include creating a new file, deleting an existing file, writing to an existing file to append the data of the existing file, or the like. If the quota (e.g., hard or soft quota) is met or exceeded, based on the quota definition, certain system rules can be executed in response. Although at least some of the embodiments described herein are described with respect to implementing a quota over multiple volumes, embodiments may also be implemented over multiple directories across one or more nodes.

When a soft quota warning level is violated, the storage system can send the user, as well as possibly the administrator, a message indicating that the user is approaching the quota specified for the particular user. In one embodiment, no other action is taken when the soft quota is violated. However, when the hard quota level is about to be violated, the storage system can prevent the data access request (e.g., disk write data access requests) that would result in hard quota violations from completing successfully. Alternatively, the storage system can wait until the quota has been violated before denying the data access request. In another embodiment, a grace interval may be used to allow a user to temporarily violate their quotas (e.g., hard quota) by certain amounts if necessary. The user is typically notified through the failed data access request (e.g., failed write data access request) with an error message generated by the violating applications, while the administrator may also receive a notification of the violation as well.

In one embodiment, the quota filter can calculate total volume set block or inode usage based on local volume accounting of each of the volumes. An inode stores basic information about a file, directory, or file system object. This allows dissimilar types of volumes on different storage servers to be part of the volume set quota. In another embodiment, the quota is implemented over multiple directories. However, it should be noted that not all types of systems support directory quota to implement the directory quota. In the embodiments of directory quota, it is assumed that the system supports a single node directory quota.

In one embodiment, the logical data flow for implementing volume set quota includes the administrator setting up quota for a user A for a set of volumes (e.g., volume set), or for a set of directories (e.g., directory set). For instance, the quota may be for a volume set, including volume A from node A and volume B from node B, or for a directory set, include directory 1 and directory 2 of node A. In one embodiment, the node is a storage server. The storage server may be a file server, which can provide clients with block-level or file-level access to data stored on the storage devices. Alternatively, the node is another type of server, such as a client-based server. In another embodiment, the storage system includes multiple nodes, such as multiple storage servers in a storage server cluster. Alternatively, other types of nodes in cluster or non-cluster configurations may be used.

The quota set up by the administrator can be configured for either block quota or inode quota. In one embodiment, the quota for a volume set or a directory set is stored in a quota database, which is accessible by both node A and node B. A quota filter, such as a protocol-level filter, is disposed in each data path of both node A and node B. That is, there are two instances of the quota filter that can access the quota database. When a quota-sensitive data access request is received at node A or node B, the quota filter instance of the particular node performs quota operations based on the particular quota-sensitive data access request to determine how the total usage of storage resources for the particular user is affected with respect to the defined quota for the user. For example, the quota filter calculates the affected blocks or inodes of the data access request and compares the resulting total volume set usage or the total directory set usage with the allowed quota for the user A. The total volume set usage may be calculated by adding usage totals of each volume for the user A via the quota filter and the quota database. When the volume set quota is met for the user A, a system rule can be executed. One system rule is to deny the current quota-sensitive data access request. In another embodiment, a warning may be generated. In one embodiment, certain balancing may be done to ensure each volume usage doesn't surpass a certain percentage of total volume quota. Alternatively, no balancing is performed. The total directory set usage may be calculated by adding usage totals of each directory for the user A via the quota filter and the quota database. When the directory set quota is met for the user A, a system rule can be executed, such as denying the current quota-sensitive data access request, or generating a warning.

Storage Node Network Environment

FIG. 1 illustrates a block diagram of one embodiment of an environment including a cluster configuration. The cluster system configuration includes a pair of nodes (e.g., storage servers) 2A and 2B coupled by a dedicated cluster interconnect 5. In other embodiments, the nodes 2A and 2B could be coupled through a non-dedicated interconnect, such as through the network 3. In one embodiment, the nodes 2A and 2B are storage servers in a storage server cluster. Alternatively, other types of nodes in cluster configurations or non-cluster configurations may be used. The node 2A is coupled to storage devices 4A, which includes multiple storage devices (e.g., disks). The node 2B is coupled to storage devices 4B, which includes multiple storage devices (e.g., disks). The nodes 2A and 2B are also coupled through a network 3 to a number of clients 1 (hereinafter simply "clients"). The storage devices 4A and 4B are managed by the nodes 2A and 2B. The nodes 2A and 2B receive and respond to various read and write requests from the clients 1, relating to volumes, directories, logical unit numbers (LUNs), files, blocks and/or other units of data stored in (or to be stored in) the storage devices 4A and 4B. Either of the storage servers 2A and 2B may be a processing system that is configured to store and retrieve data on behalf of one or more client processing systems, such as the clients 1. In the context of NAS, the storage server may be a file server. In one embodiment, either or both of the storage servers 2A and 2B are storage servers, made by Network Appliance, Inc. of Sunnyvale, Calif. In a SAN context, the storage server provides clients with block-level access to stored data, rather than file-level access. Some storage servers are capable of providing clients with both file-level access and block-level access, such as certain storage servers made by Network Appliance, Inc. of Sunnyvale, Calif.

Each of the clients 1 may be, for example, a conventional personal computer (PC), workstation, or the like. The clients 1 may be general-purpose computers configured to execute software applications. Each client 1 may communicate with the nodes over the network 3 by exchanging data according to pre-defined protocols, such as Transmission Control Protocol/Internet Protocol (TCP/IP). Moreover, the client 1 may interact with the nodes in accordance with a client/server model of information delivery. That is, the client may request the services of the node, and the system may return the results of the services requested by the client, by exchanging data over the network 3. The clients 1 may issue commands and data using file-based access protocols, such as the Common Internet File System (CIFS) protocol or Network File System (NFS) protocol, over TCP/IP when accessing information in the form of files and directories. Alternatively, the client may issue commands and data using block-based access protocols, such as the Small Computer Systems Interface (SCSI) protocol encapsulated over TCP (iSCSI) and SCSI encapsulated over Fibre Channel Protocol (FCP), when accessing information in the form of blocks.

In one embodiment, the node 2A is a storage server used in a NAS mode. In another embodiment, the node 2A is, a block-based storage server such as used in a SAN. In another embodiment, the node 2A is a storage server which can perform both file-level access and block-level access for clients. Alternatively, the node 2A may be another type of server in a cluster or non-cluster configuration. The network 3 may be, for example, a local area network (LAN), a metropolitan area network (MAN), a virtual private network (VPN), a wide area network (WAN), a global area network (GAN) such as the Internet, or other type of network or combination of networks. The network 3 may implement, for example, Ethernet protocol, FCP, or another protocol or a combination of protocols.

The storage devices 4A and 4B may store data represented in an active file system of the nodes 2A and 2B. The active file system is a file system to which read and write data access requests can be made. The file system layer 21 is an application-level programmatic entity or layer which imposes the hierarchal structure on the data sets, such as the files, directories and/or other data containers stored and/or managed by a storage server, and which services read and write requests from clients of the storage server. The storage devices in the storage devices 4A and 4B may be, for example, conventional magnetic disks, optical disks such as CD-ROM or DVD based storage, magneto-optical (MO) storage, or any other type of non-volatile storage devices suitable for storing large quantities of data. The storage devices in the storage devices 4A and 4B can be organized as one or more RAID groups, in which case the nodes 2A and 2B access the storage devices 4A and 4B using an appropriate RAID protocol.

Storage of information can be implemented as one or more storage "volumes", such as volume 6A on node A and volume 6B of node B, each of which includes a set of one or more physical disks managed cooperatively to define an overall logical arrangement of disk space on the volume(s). A volume is a logical data set which is an abstraction of physical storage, combining one or more physical storage devices or parts thereof into a single logical storage object (e.g., data storage unit), and which is managed as a single administrative unit, such as single file system. Typically, file systems have a one to one mapping to volumes where volumes can be constructed from one or more storage devices (e.g., disks). Typically, a volume management layer, which is separate from the file system layer, handles the arrangement of storage devices and provides the appearance that a single volume exists to the file system layer. Each volume is generally, although not necessarily, managed as a separate file system. Each volume stores a copy of a data set, and each node has its own data sets as well as has access to the other node's data sets. It should be understood that while only two nodes are shown in the illustrative cluster configuration, it is expressly contemplated that any other number of nodes and volumes may be connected in a cluster or non-cluster configuration. It should also be noted that although the volumes 6A and 6B and aggregate 7 are illustrated in the storage server 2A of FIG. 1, the volumes 6A and 6B and aggregate 7 are presented on the storage server, while the content of the volumes 6A and 6B and aggregate 7 reside on the storage devices 4.

Figure 2:
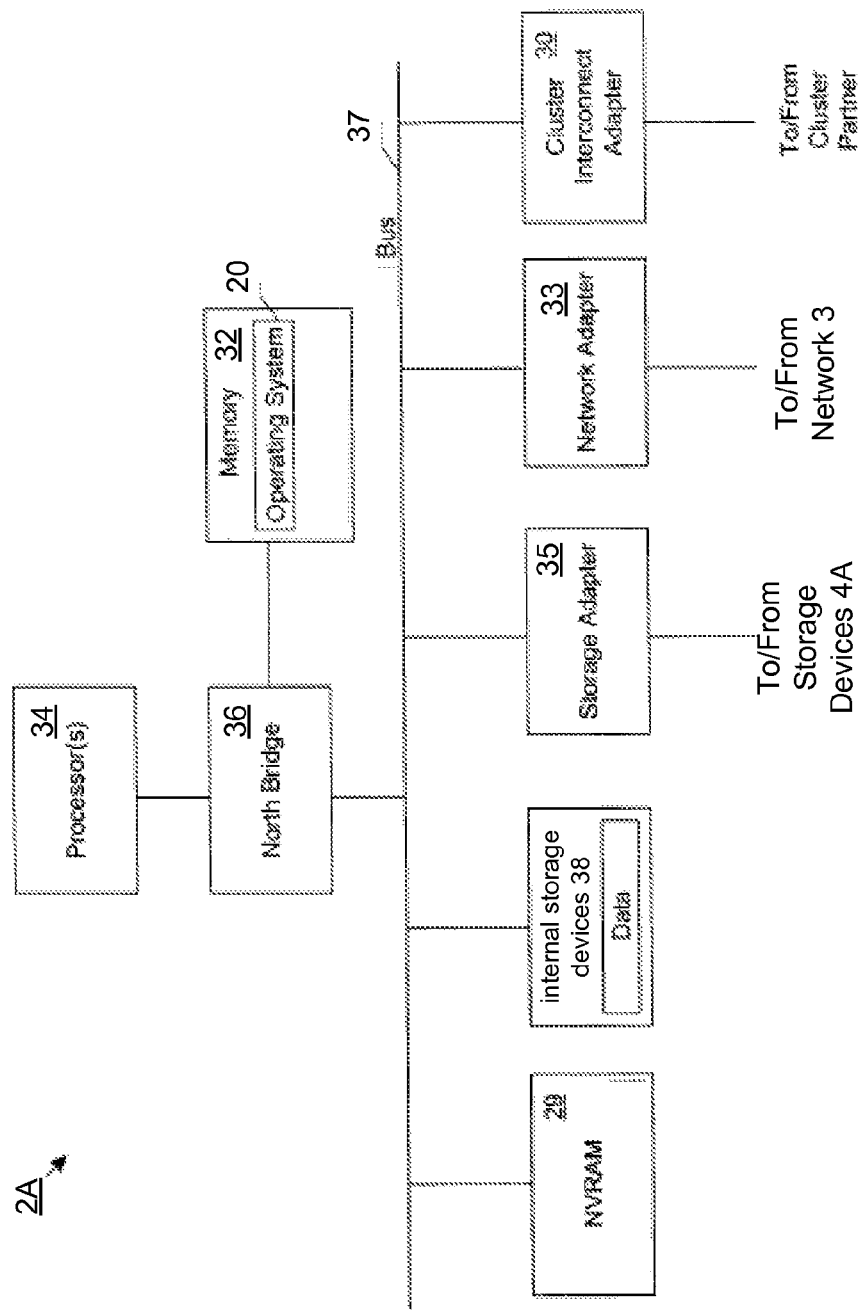
FIG. 2 illustrates a block diagram of one embodiment of the architecture of a storage server.

FIG. 2 illustrates a block diagram of one embodiment of the architecture of a storage server 2A. The storage server of FIG. 2 can represent either the node 2A or node 2B. The storage server 2A includes one or more processors 34 and a system memory 32 coupled to each other by a north bridge 36. The north bridge 36 is also coupled to a bus 37 (e.g., Peripheral Component Interconnect (PCI) bus). The north bridge 36 provides an interface between peripheral components on the bus and the processors 34 and system memory 32.

Each processor 34 is a central processing unit (CPU) of the storage server 2A and, thus, controls the overall operation of the storage server 2A. In certain embodiments, a processor 34 accomplishes this by executing software stored in system memory 32. Such software may include the operating system 20 of the storage server 2A. Each processor 34 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 32 is a random access memory (RAM) which stores, among other things, the operating system 24 of the storage server 2A, in which the techniques introduced herein can be implemented.

Connected to the bus 37 are a non-volatile memory 29 (e.g., NVRAM 29), which stores the non-volatile data of the storage server 2A (e.g., storage server and associated storage devices); one or more internal storage devices 38; a storage adapter 35; a network adapter 33; and a cluster interconnect adapter 30. The NVRAM 29 is configured to store information about the storage server and associated storage devices, such as, for example, a record of write requests received from clients since the last consistency point may be stored in NVRAM.

Internal storage devices 38 may be or include any conventional medium for storing large volumes of data in a non-volatile manner, such as one or more disks. The storage adapter 35 allows the storage server 2A to access the external storage devices 4A and may be, for example, a Fibre Channel adapter, a SCSI adapter, or the like. The network adapter 33 provides the storage server 2A with the ability to communicate with remote devices such as the clients 1 over a network and may be, for example, an Ethernet adapter, or the like. The cluster interconnect adapter 30 provides the storage server 2A with the ability to communicate with its cluster partner. It should be noted that the cluster interconnect adapter can also be implemented in the same physical components as the storage or network adapters 35 and 33.

Figure 3:
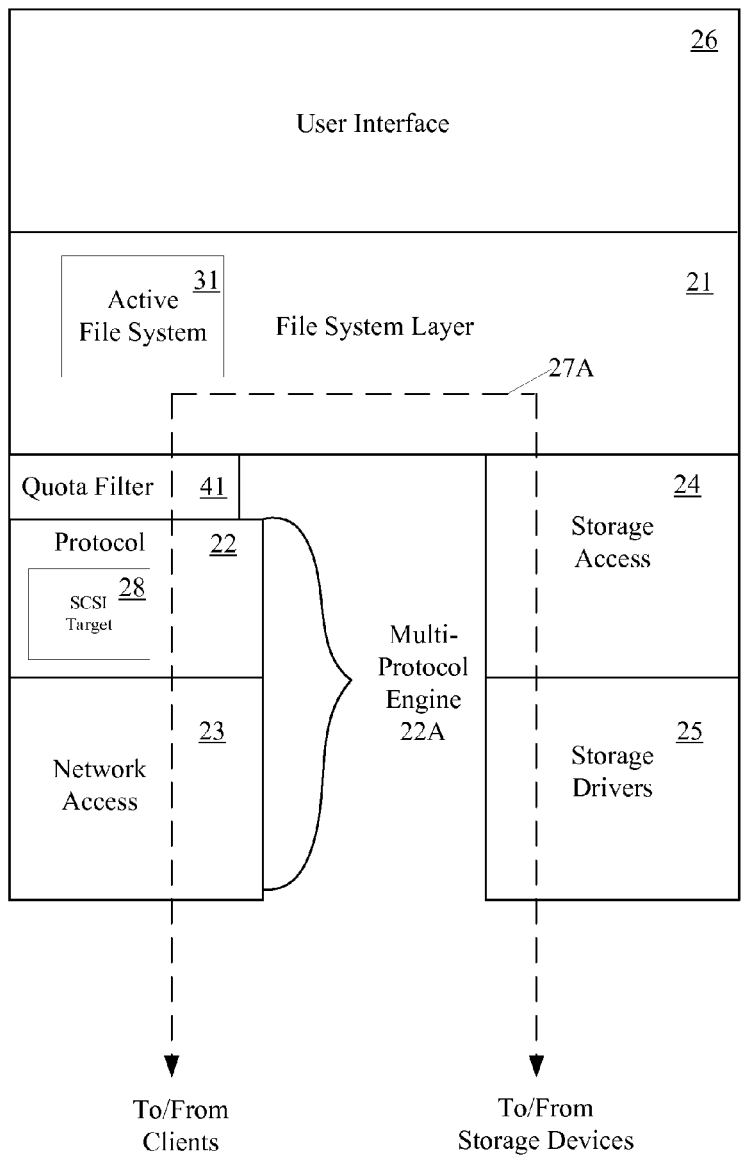
FIG. 3 illustrates one embodiment of the architecture of the operating system of the storage server of FIG. 2.

FIG. 3 shows one embodiment of the architecture of the operating system of the storage server 2A of FIG. 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2A and which services read/write requests from clients 1, among other functions. This hierarchy is referred to as the "active file system" 31. Logically "under" the file system layer 21, the operating system 20 also includes a protocol layer 22 and an associated network access layer 23 to allow the storage server 2A to communicate over the network 3 (e.g., with clients 1). The protocol layer 22 implements various higher-level network protocols, such as NFS, CIFS, Hypertext Transfer Protocol (HTTP), Fibre Channel Protocol (FCP), Internet SCSI (iSCSI), and/or other Upper Layer Protocols (ULP). In addition, assuming the storage server 2A is configured to operate in a SAN, the protocol layer 22 can also include a SCSI target layer 28, to enable the storage server 2A to receive and respond to SCSI I/O operations (i.e., read and writes). For block level access, the protocol layer 22 may be split in half where the bottom half represents the transport protocols iSCSI and FCP, and the top half is the common SCI target layer. The network access layer 23 includes one or more drivers which implement one or more lower-level protocols to communicate over the network, such as Ethernet, or TCP/IP. The network access layer may include TCP/IP stack as well as the lower level data link layer which includes the physical interfaces like Ethernet, a host bus adapter (HBA) which may provide a Fibre Channel interface, or the network adapter 33. The protocol layer 22 and the network access layer 23 can be collectively referred to as a multi-protocol engine 22A.

Also logically under the file system layer 21, the operating system 20 includes a storage access layer 24 and an associated storage driver layer 25, to allow the storage server 2A to communicate with the storage devices 4. The storage access layer 24 implements a higher-level disk storage protocol, such as an implementation of RAID, while the storage driver layer 25 implements a lower-level storage device access protocol, such as Fibre Channel Protocol (FCP) or small computer system interface (SCSI). Also shown in FIG. 3 is the path 27A of data flow, through the operating system 20, associated with read or write data access requests of the attached storage devices.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2A.

The storage server 2A has an active file system 31, which is created and managed by the file system layer 21 of the operating system 20. In one embodiment, the file system layer 21 is the WAFL® (Write Anywhere File Layout) file system, available from Network Appliance, Inc. of Sunnyvale, Calif. Alternatively, other file systems may be used.

Multiple Node Quota Filter

As described above, the embodiments described herein allow a quota to be implemented over a data storage system having data associated with the user stored in multiple storage servers.

Figure 4:
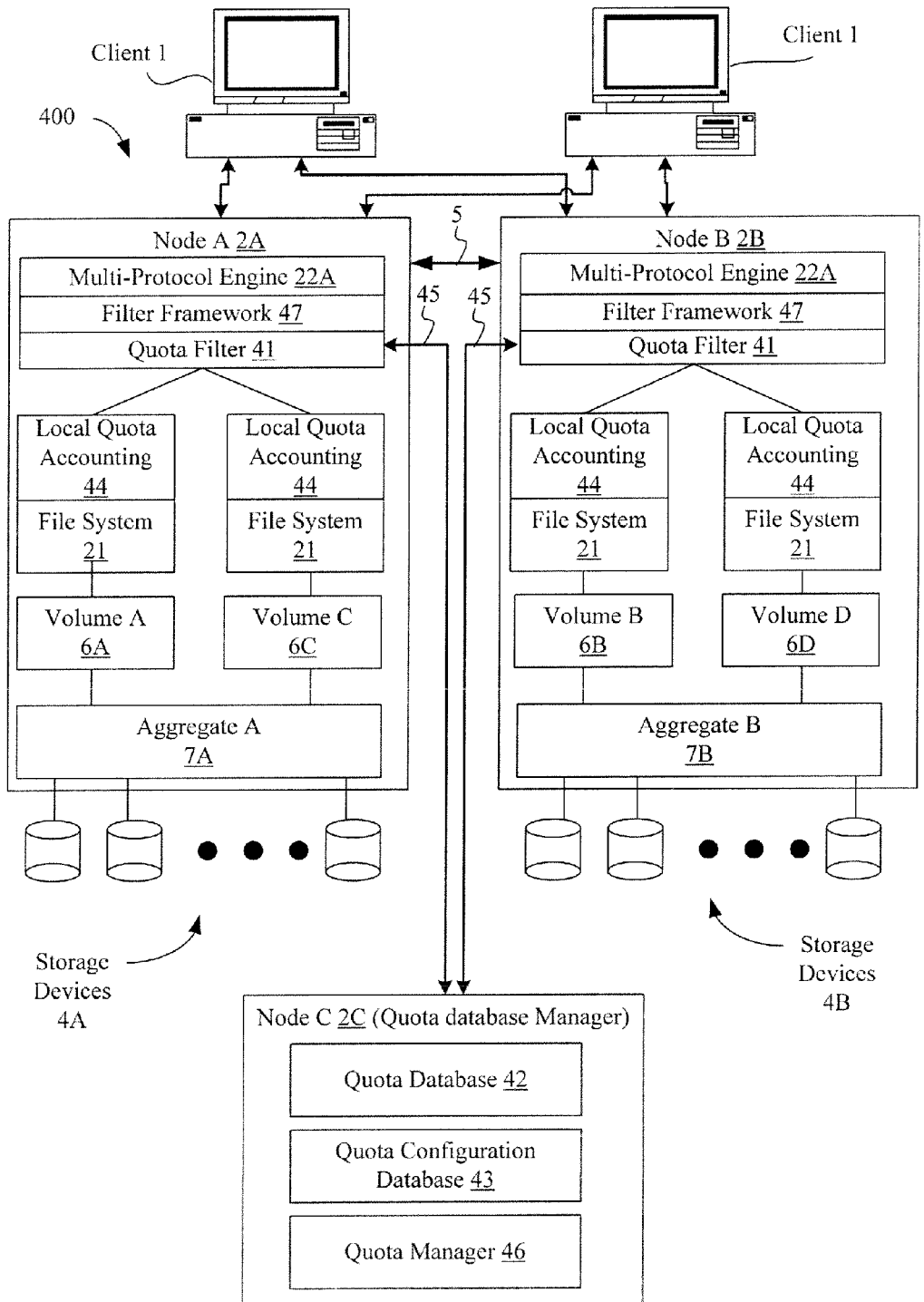
FIG. 4 illustrates a block diagram of one embodiment of a cluster configuration including a quota database manager.

FIG. 4 illustrates a block diagram of one embodiment of a cluster configuration 400 including a quota database manager 2C. The configuration 400 includes two nodes (in this case, storage servers) in storage server cluster, as described above with respect to FIG. 1, and a third node 2C, which is configured to be the quota database manager 2C. The quota database manager 2C is a quota management system for the storage system and may be configured to store a quota database 42 and a quota configuration database 43. The quota database 42 and the quota configuration database 43 may be stored as separate databases, or alternatively, as a single database. In another embodiment, the quota database manager 2C is implemented on the client 1. In one embodiment, the quota database manager 42 is a server implementing Data ONTAP® GX operating system, available from Network Appliance of Sunnyvale, Calif., to implement a relational database (RDB), which stores both the total usage of storage resources, as well as the quota of storage resources for the storage system. Alternatively, other types of devices may be used. The quota database manager 2C includes a quota manager 46 which is executed on one or more processors and stored in a system memory (processor and memory are not illustrated in FIG. 4). Although the one or more processors and system memory are not illustrated in FIG. 4, the one or more processors execute software stored in system memory, as known to those of ordinary skill in the art. The quota database manager 2C may be a storage server, as described with respect to FIGS. 1-3, or alternatively, may be another type of server that manages the quota database 42 and quota configuration database 43. The total usage of storage resources may include total usage of disk space that is used by the user, number of files or directories used that is used by the user, total inode consumption, or the like. It should be noted that the total usage may be calculated by the quota manager 46 and stored in the quota database. The quota manager 46 may also manage the quota policy as stored in the quota configuration database 43. The quota may include a block quota that is representative of a limit of disk space that can be used by the user. In another embodiment, the quota may include a storage server quota that is representative of a limit of files and directories that can be created by the user. Alternatively, the quota may be usage quota, file quota, inode quota, or the like.

The quota database 42 may be an accounting database that stores the total usage for a user or a group of users over the designated storage set, such as the designated volume set or directory set. The quota configuration database 43 may include information such as the defined quota for one or more users. The quota configuration database 43 may also store additional information regarding the quota configuration, such as a quota policy that includes quota definitions for one or more users of the storage system. The quota configuration database 43 may also store the user identity (e.g., user ID, group ID), total number of files or total number of blocks, destination (e.g., directory ID, volume ID, or combination of directory IDs and volume IDs), a time parameter (e.g., time to decide the valid range that the quota applies), hard and soft quotas, a quota leniency rate (e.g., available storage above soft quota, for example, 10%, before reaching the hard quota), a growth rate, which allows a user to use more storage resources over time (e.g., 1% per month increase in quota), or the like.

In one embodiment, the quota configuration database 43 includes entries, such as the exemplary entries described in Table 1-1, and the quota database 42 includes entries, such as the exemplary entries described in Table 1-2. It should be noted that the quota configuration database 43 and quota database 42 may be implemented in a single database. The quota configuration database 43 includes entries that include an identifier and policy limits corresponding to the identifier. The identifier may include a type of identifier (e.g., user, group, or directory), the name of the identifier (e.g., User A, Human Resources (HR), dir2), and the scope of the identifier (e.g., /cluster_a, /cluster_b/dir1, or /cluster_c/dir1). The policy limits may include a file limit, a block limit, a soft file limit, and a soft block limit. Alternatively, the quota configuration database 43 may store more or less information as described in Table 1-1. It should be noted that the following table use the following abbreviations, kilobytes (KB), megabytes (MB), gigabytes (GB), and terabytes (TB).

Quota Configuration Database 43

TABLE 1-1

| Identifier | | | Policy (Limits) | | | |
|---|---|---|---|---|---|---|
| Type | Name | Scope | File Limit | Block Limit | Soft File Limit | Soft Block Limit |
| User | User A | /cluster_a | 200 KB | 10 GB | 100 KB | 5 GB |
| Group | HR | /cluster_b/dir1 | 1 MB | 1 TB | 1 MB | 1 TB |
| Directory | dir2 | /cluster_c/dir1 | 500 KB | 5 GB | 200 KB | 2 GB |

The quota database 42 includes entries that include an identifier and the runtime usage. The identifier may include a type of identifier (e.g., user, group, or directory), the name of the identifier (e.g., User A, Human Resources (HR), dir2), and the scope of the identifier (e.g., /cluster_a, /cluster_b/dir1, or /cluster_c/dir1). The runtime usage may include total files used and total blocks used. Alternatively, the quota database 42 may store more or less information as described in Table 1-2.

Quota Database 42

TABLE 1-2

| Identifier | | | Runtime Usage | |
|---|---|---|---|---|
| Type | Name | Scope | Total Files | Total Blocks |
| User | User A | /cluster_a | 45663 | 42017593 |
| Directory | dir2 | /cluster c/dir1 | 94560 | 1450472343 |

In another embodiment, the quota policy database 42 and the quota configuration database 43 are stored locally on one of the storage servers 2A or 2B.

Both nodes 2A and 2B can access the quota database 42 via the quota filter 41 and corresponding filter framework 47 of each of the nodes 2A and 2B. Each of the quota filters 41 communicates with the quota database manager 2C storing the quota policy database 42 and the quota configuration database 43 by an interconnect line 45. The interconnect line 45 may be, for example, Ethernet, Remote Direct Memory Access (RDMA), FCP, 802.11B, or the like. As described above, the quota filter 41, which sits in the data path of each node between the multi-protocol engine 22A and the file system layer 21, such as illustrated in FIGS. 3 and 4, can calculate block and/or inode consumption for one or more volumes of the node. Similarly, the quota filter 41 can calculate block and/or inode consumption across one or more directories of the node.

In one embodiment, the storage server 2A receives data access requests from one or more clients 1 via protocol layer 22, and the quota filter 41 monitors the data access requests on the node to check for quota-sensitive data access requests, and determines a local usage of storage resources for the user for that node. The local usage may be determined by the quota filter 41, or alternatively, by the quota database manager 2C. The local usage is determined for each of the volumes of the volume set, for example, on volume 6A and volume 6B. In another embodiment, the volume set includes volumes 6A and 6C of aggregate 7A on node 2A and volume 6B and 6D of aggregate 7B on node 2B. Alternatively, the volume set may be more or less than the illustrated volumes of FIG. 4. In another embodiment, the local usage is determined for each directory of the directory set.

The quota database manager 2C, using the determined local usage from each of the nodes, can determine the total usage of storage resources for the volume set across the multiple nodes or for the directory set on a single node or across multiple nodes. For example, in a volume set, the local usage is determined on each of the nodes, and the quota database manager 2C sums the local usages to determine the total usage. The total usage may be stored in the quota database 42. In another embodiment, the local usage received from each of the quota filters 41 can also be stored in the quota database 42.

In another embodiment, the total usage, which corresponds to a volume usage on a volume set having multiple volumes across multiple nodes, such as volume 6A on storage server 2A and volume 6B on storage server 2B, may be determined by determining the volume usage on each volume of the volume set and the volume usage on each volume is summed to determine the volume usage on the volume set (e.g., total usage). For example, the volume usage on volume 6A is determined, the volume usage on volume 6B is determined, and the sum of the volume usage on volume 6A and volume 6B is determined to be the total volume usage of the volume set. In another embodiment, the IO data access requests for the user on a particular volume are monitored to check for quota-sensitive data access requests. The volume usage for the user on the particular volume is updated based on the monitoring. Each of the volumes of the volume set is similarly monitored to check for quota-sensitive data access requests, updating the volume usage for each of the volumes. After determining the volume usage on each of the volumes, the volume usages are summed to get the total usage for the user on the volume set.

Alternatively, the local usage of each storage server is determined by determining the storage server usage (e.g., total usage on all volumes of the volume set that reside in a particular storage server) for the user on each storage server, and the storage server usage from each of the storage servers is summed to determine the total usage of the user. In this embodiment, the IO data access requests for the user on a particular storage server are monitored to check for quota-sensitive data access requests. The storage server usage for the user on the particular storage server is updated based on the monitoring. Each of the storage servers is similarly monitored to check for quota-sensitive data access requests, updating the storage usage for each of the storage servers. After determining the storage usage on each of the storage servers, the storage server usages are summed to get the total usage for the user on the volume set.

In another embodiment, a volume quota can be set for a user for a set of volumes across multiple storage servers. The volume quota can be stored in the quota database 42, which is accessible by each of the storage servers. At the quota filter of each storage server, quota-sensitive data access requests are received, and the affected storage resources are calculated based on the received quota-sensitive data access requests. The affected storage resources may be a summation of the volume usage of each volume of the volume set for the user. In one embodiment, the volume set is balanced to ensure that each volume usage does not exceed a certain percentage of the quota. For multiple-directory quotas or multiple volume quotas, generally the concern for the administrator is for the total usage to be contained under the quotas. For example, if an administrator wants to make sure each volume doesn't user more than 75% of the total quota, then the quota filter on each volume may be configured to perform an additional check that the local consumption does not exceed 75%, in addition to checking the total consumption is contained under the total quota (e.g., 500 GB for volume 6A and 6B). The affected storage resources are compared against the defined volume quota for the user, and a system rule is executed when the affected storage resources meets or exceeds the quota. In one embodiment, the quota includes a block quota that is representative of a limit of disk space that can be used by the user. The affected storage resources may include the total usage of disk space that is used by the user.

In another embodiment, the quota includes a storage server quota, such as a file or inode quota or a directory quota, that is representative of a limit of files and directories that can be created by the user. Alternatively, other types of quota may be used. The system rule may include denying a particular quota-sensitive data access request, generating a warning that the user is approaching or exceeding the user's quota.

Once the total usage has been determined, the user can be limited to a volume quota of storage resources across multiple volumes (e.g., volume 6A and volume 6B) across multiple nodes (e.g., storage servers 2A and 2B). This may be done by determining the total usage, as described above, and comparing the total usage (e.g., sum of the local usages of nodes 2A and 2B) against the volume quota defined for the user. If the quota (e.g., hard or soft quota) is met or exceeded, based on the quota definitions in the quota policy, certain system rules can be executed in response, such as, for example, access denial for the quota-sensitive data access request.

In another embodiment, once the total usage has been determined, the user can be limited to a directory quota across multiple directories (e.g., directory 1 of volume 6A and directory 2 of volume 6C or directory 1 of volume 6A and directory 2 of volume 6B). This may be done by determining the total usage, as described above with respect to the volume quota, and comparing the total usage (e.g., sum of the local usages of nodes 2A and 2B) against the directory quota defined for the user. If the quota (e.g., hard or soft) is met or exceeded, based on the quota definitions in the quota policy, certain system rules can be executed in response, such as, for example, access denial for the quota-sensitive data access request.

In one embodiment, the quota includes a soft-quota definition. When the soft quota is met (or exceeded), a system rule can be executed that generates a warning that the user is approaching or exceeding the quota for the user. The system rule indicates an action that is to be performed in response to the violation of the quota policy. The system rule can be stored in memory of the storage server, or alternatively, in memory of the quota database manager. In another embodiment, the quota includes a hard-quota definition. When the hard quota is met (or exceeded), a system rule can be executed that prevents the quota-sensitive data access request that would cause the quota to be exceeded. The system rule indicates an action that is to be performed in response to the violation of the quota policy. The quota-sensitive data access request may be a data access request for creating a new file or writing to an existing file to append the data of the existing file. In another embodiment, the quota includes a grace interval, which allows the user to temporarily violate the quota by a predetermined amount. For example, the grace interval can have a lower limit equal to the hard quota and an upper limit that is greater than the lower limit. When the grace interval has been met, a system rule can be executed that generates a warning that the user is approaching or exceeding the quota for the user, but does not prevent the quota-sensitive data access request until the upper limit is exceeded. Alternatively, the quota may include any combination of a hard-quota definition, a soft-quota definition, or a grace interval definition.

In one embodiment, the user can be limited to a quota of storage resources across the multiple nodes (e.g., storage servers). The user may be limited to a quota based on a volume set having multiple volumes on one or more nodes. Alternatively, the user may be limited to a quota based on a directory set having multiple directories on one or more nodes.

In another embodiment, the quota filter 41 can calculate total usage (e.g., volume set block or inode usage) based on local volume accounting of each of the volumes. Some file systems layers 21 include a local quota accounting system 44 that determines the local volume accounting of the user on the volume (e.g., volume 6A) associated with the file system layer 21. In systems that include local volume accounting for each of the volumes, the quota filter 41 can access the local quota accounting system 44 to determine the volume usage for the associated volume. This allows dissimilar types of volumes on different storage servers to be part of the volume set quota. Using the local accounting on each of the volumes, the total usage of storage resources for the user can be determined for the user over multiple volumes across multiple nodes. Once the total usage is determined, it can be compared against the quota for the user to determine if the quota has been met or exceeded.

As illustrated in FIG. 4, in one embodiment, the quota filter 41 is implemented as a protocol layer filter in the protocol layer 22. A protocol filter is one type of filter that intercepts the request in the protocol server. In terms of layering, as describe herein, the protocol filter is between the client and protocol layer. This protocol filter may also be disposed between the protocol layer and the file system layer before the protocol has been translated to the file system request. Alternatively, the quota filter 41 may be implemented in other layers of the operating system to monitor the IO data access requests to check for quota-sensitive data access requests that affect the storage resources and to calculate the affected storage resources (e.g., blocks or inodes) of the data access request, which is summed with the calculated affected storage resources of other nodes to determine the total volume set usage. Once the total volume set usage is determined, it is compared against the quota for the user to determine if the quota is met or exceeded.

In another embodiment, the quota is implemented over multiple directories. However, it should be noted that not all types of systems support directory quota to implement the quota. In the embodiments of directory quota, it is assumed that the system supports single node directory quota.

In one embodiment, the logical data flow for implementing a volume quota includes the administrator setting up (e.g., defining or modifying) the volume quota for a user A for a set of volumes. For example, the volume quota may be for volume 6A on node 2A and volume 6B on node 2B. Alternatively, the quota may be for volumes 6A and 6C (e.g., of aggregate 7A) on node 2A and volumes 6B and 6D (e.g., of aggregate 7B) on node 2B.

Figure 5:
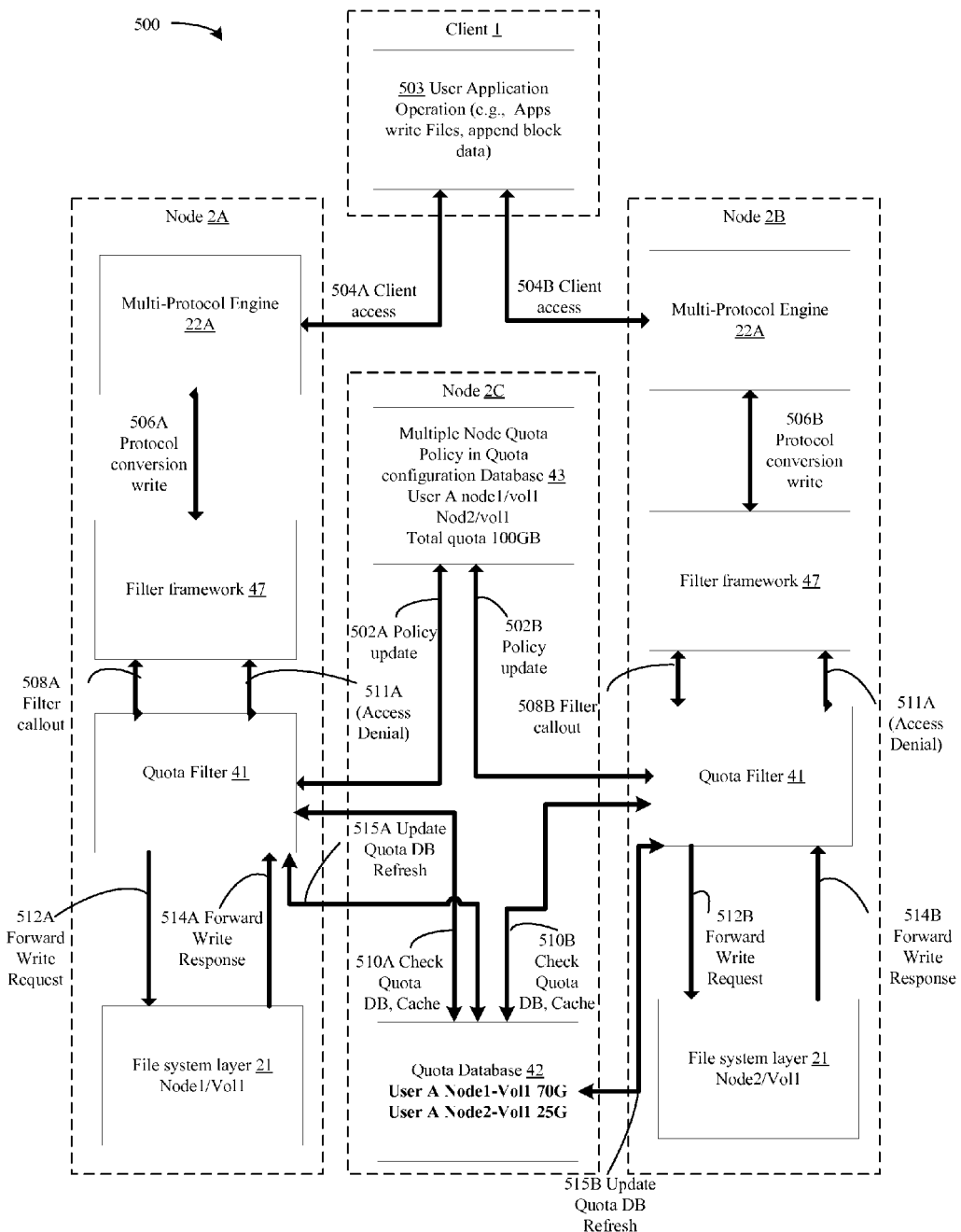
FIG. 5 illustrates one embodiment of a flow chart of a method of a write data access request processed by a storage system implementing a multiple-node quota system.

FIG. 5 illustrates one embodiment of a flow chart of a method 500 of a write data access request processed by a storage system implementing a multiple-node quota system. As part of the method 500, a multiple-volume quota policy can be created and stored in the quota configuration database 43 of the quota database manager 2C. In particular, the quota configuration database 43 may store a multiple-node quota policy, which includes a quota definition that defines the quota for a particular user to storage resources of the storage system, for example, a volume quota. The quota definition may include policy parameters, such as a user entity, such as an individual user or a group of users, a data entity, such as a node, a node and volume, a cluster, or a node, volume, and directory, and a quota, such as a specified amount of storage units for the particular user (or group). In this particular embodiment, the data entity is a volume set having multiple volumes. The quota may be specified by units of storage, such as kilobytes (KB), megabytes (MB), gigabytes (GB), terabytes (TB), or the like. For example, user A can have a quota of 100 GB in the volume set (e.g., 100 GB in volume 6A of node 2A and volume 6B of node 2B). Alternatively, the quota for user A may be 100 GB in a directory set (e.g., 100 GB in directory 1 of volume 6A of node 2A and directory 2 of volume 6B of node 2B). Alternatively, the quota may include other limits in different or similar configurations.

In another embodiment, the quota policy has already been created and the administrator modifies the quota policy to set the quota for the particular user and/or group of users.

Once the quota policy has been created or modified and stored in the quota configuration database 43, the quota policy is updated in the quota filters 41 of nodes 2A and 2B, operation 502A and 502B. A user-level program may load the configuration and send it to the quota filters 41, for example, by a user-to-kernel level communication, such as through, for example, shared memory, driver system call (e.g., IO control (IOCTL) call), TCP socket call, remote procedure call (RPC), or the like.

Once the quota filters 41 have been updated with the quota policy, a user or an application running on a client may attempt to perform a user-application operation, such as write to file operation, append block data operation, or the like, which requires a client to access data (e.g., files) stored in the storage system at operation 503. The storage system may include node 2A and node 2B, as well as node 2C, which includes the quota database. As described above, the nodes 2A and 2B may each include a multi-protocol engine 22A that services client accesses 504A or 504B. The multi-protocol engines 22A, receives client accesses 504A or 504B, and in response performs protocol conversion of the client accesses corresponding to the write data access requests in operation 506A or 506B. The client access 504A or 504B may be NFS or CIFS protocol requests, such as IO data access requests (e.g., a write access request) received over an Ethernet port or other types of network ports. The client sends the IO data access request to the multi-protocol engines 22A according to the individual protocol specification. It should be noted that although the client access is described as being performed remotely over a network, alternatively, access can also be done locally.

As described above, the multi-protocol engines 22A receives the IO request from the client, parses the IO request, converts the request into a system internal request, and forwards the request to the filter framework 47. On the return path, the multi-protocol engine 22A converts the internal response to IO response via the designated protocol. The filter framework 47 receives the internal request from the protocol conversion. The filter framework 47 decides the call model to be used. The call model may be synchronous, asynchronous, or sniff mode. In synchronous mode, the quota filter 41 holds the incoming IO request, blocks the calling thread until the work is completed on the IO request. In asynchronous mode, the quota filter 41 holds the incoming IO until the work is completed on the IO request, but releases the calling thread. In sniff mode, the quota filter 41 does not block incoming IO requests or calling threads. The filter framework 47 can make a reference or copy of incoming IO parameters.

The filter framework 47 may be implemented as an application that is "hooked into" or coupled to the storage server in one or more of a variety of locations. The locations for hooking the filter framework 47 include points in a data flow, such as at a client interface, a protocol interface, a network interface or a messaging interface for communicating with storage devices. The filter framework 47 provides a queue for each point at which the filter framework 47 is coupled to the storage server. The queues are maintained on a volume basis. The queues maintain filter call identifiers to enable filters to intercept data in the data path for the point at which the filter framework 47 is coupled to the storage server. A storage server controller is provided to capture request and responses for file system data and invoke applicable filters. The filter controller may invoke filters according to several different invocation models, including synchronous, asynchronous, and asynchronous release configurations.

The quota filters 41 associated with the filter framework 47 may be loaded or unloaded in the filter framework 47. The quota filters 41 are arranged in a particular order for callback operations, based on, for example, priority. A callback represents instructions passed to a given filter for execution, often to call other procedures or functions. For example, a callback to the quota filter may be in the form of a pointer to a function or procedure passed to the quota filter. The quota filter can produce I/O requests, with each filter I/O being provided with a tag for identification. The filter I/O tagging permits the filter framework 47 to identify the originating quota filter of the filter I/O. One advantage to providing filter I/O tagging is to avoid conflicts that may occur with multiple I/O requests from a single filter source. In addition, filter I/O tagging contributes to permitting the filter framework 47 to determine if the filter I/O has a particular priority, based on the filter priority. Quota filters with higher priority can potentially receive a greater time slice of available processing time. Accordingly, by tagging the filter I/O, the filter framework 47 can allocate processing time to I/O requests more appropriately.

In one embodiment, the quota filters 41 can be cascaded. Multiple quota filters can be stacked above each other so that there can be multiple quota instances. For example, the IO requests will route to the first quota filter, then to the next quota filter. Until all quota filters have approved the IO, then the IO request can proceed. To approve a request means to pass the request down the filter stack and to pass the reply for request from below up without alteration. Based on the nature of the IO request, some quota filters need to update the quota database. In one embodiment, multiple-directory quota is stacked with multiple node quota.

In another embodiment, the quota filter 41 is implemented in the kernel space. In another embodiment, the quota filter 41 is implemented in the user space. User mode or user space is typically ring 3 of the protection rings of fault tolerance and computer security, while the kernel mode or kernel space is ring 0. Normally, the kernel mode runs the operating system (OS), so quota filter can run in kernel mode. The filter framework 47 enumerates quota filters and makes callouts one by one in operation 508A or 508B. The filter framework 47 uses incoming requests, and forwards the incoming requests to each of the filter's requested callback. In the return path, the filter framework 47 receives filter's response data, enumerates filters, and invokes filter's response callback in operation 511A and 511B. For example, as described below, the response data may indicate that the data access request should be denied because it violates the quota policy. Alternatively, the response data may indicate other operations, as defined by the quota policy.

The filter framework 47 may filter the IO order and perform IO conflict management. The filter framework 47 may ensure that IO requests are ordered in the correct form. When the filters are ordered, any IO generated from the filters may be identified through predefined tags. In one embodiment, the filter framework 47 may invoke read requests for quota through the filter callout operation 508A or 508B. The quota filter 41 may register itself into the filter framework 47 for callbacks on access request, for example, stored in memory of the storage server, such as file open or create, read, directory read, write, or the like.

The filter framework 47 invokes a filter request callback on the incoming path, and response callback on the return path. The filter callout uses a special request/response structure for each IO data access request. The structure ranges from parameters needed for system calls in open systems or to special-designed protocol systems, such as file ID, volume ID, data access request type, originating IP address, time, priority, originator ID, data access request related parameters, or the like. Additional filter callout parameters may include protocol type. The callout module can be a function call or a message pass. Filter callout invokes read request functions of the quota filter via mechanisms, such as function calls or message passes.

The quota filter 41 on each of the nodes may be configured to perform various operations. The quota filter 41 is configured to monitor and detect quota-sensitive data access requests based on the quota policy configured in operation 502A and 502B. For example, user A has a quota of 100 GB on the volume set, such as volume 6A on node 2A and volume 6B on node 2B. If the data access request is not quota sensitive, the method moves to operation 512A or 512B to forward the request to the file system. For quota accounting on the storage system, the multiple node quota may be based on client entity, such as a user, or a group of users, and the target entity, such as a volume, directory, node, or cluster. The total quota may be a number that reflects the total block consumption or inode consumption based on the client and/or target entity. A quota database 42 can be implemented on the quota database manager 2C. The quota database 42 is used to store information for the global quota (e.g., total usage and total quota). Also, information regarding the client entity, the total usage, the quota type, the target entity may be stored in the quota database 42. It should be noted that not all accesses need to be counted. In one embodiment, only the accesses based on all the quota policies can be counted, and if policies change, then new counting can be enabled, while other counting will not be continued. For example, if the quota policy doesn't specify the quota configuration for volume 6A, then there is no need to do accounting for volume 6A.

In operation 510A and 510B, the module calculates results for multiple data access requests by checking quota database 42 in the quota database 42. For example, in one embodiment of a write data access request, the quota filter 41 checks the quota database 42, which is aware of the quota and total usage over multiple nodes across multiple nodes, to see if intended write data access request would meet or exceed the quota (e.g., soft or hard quota). In another embodiment for creating a new entry, the quota filter 41 checks the quota database 42 to see if the intended write would meet or exceed the quota (e.g., hard or soft). In one embodiment, a cached copy, such as a read-only copy, of all or a portion of the quota database is stored locally on the storage server 2A to facilitate access on the respective nodes. The cached copy may be used to facilitate an expedited lookup operation for subsequent lookup operations to the quota database 42 or the quota configuration database 43 to determine whether the quota has been violated or not for the particular data access request. In another embodiment, a ticket is used to decide how long to keep the cached copy on the respective node.

In another embodiment of creating a new file, the data access request of creating a new file can be denied if the total number of files associated with the user is over the hard limit. Since quota can span over multiple nodes, in one embodiment, the storage system does not limit the amount of data stored on a particular node or volume, but only the total usage on the storage system. Alternatively, the storage system may limit the total usage, as well as the amount of data storage on a particular node or volume. In another embodiment, the quota policy can be set up to limit the total number of files in a multiple directories on the same or different node. Each successful new entry of file or directory may increment the total by one, but a failed data access request does not change the quota entry.

In one embodiment, for some data access requests, such as non-quota-sensitive data access requests, the quota filter does not check or update the quota. However, for appending existing blocks or new write data access requests, the quota database is checked to determine that the append or new write data access request does not meet or exceed the quota. It should be noted that normally one append data access request affects only one volume. In another embodiment for a truncation request, the quota filter does not do a quota check, but needs to update the result of the truncation data access request. Similarly, in another embodiment of a partial write data access request, the quota filter only updates the actual addition of the write. In another embodiment of a striped write, the quota filter when implemented below the striped write logic, only receives writes intended to the volume that the quota filter covers. If the quota filter sees a striped write, the quota filter needs to only check and update the portion of the volume that the striped write affects.

As described above, the quota database 42 stores quota entries. The quota database 42 may be a runtime usage database that tracks a total usage of storage resources by the user. For example, an entry may be based on the block consumption for the user, such as User ID 100 (User A)—Node1/Vol1 70 GB, and User ID 100 (User A)—Node2/Vol1 25 GB. The entry may also be based on the inode consumption for the user, such as User ID 100 (User A)—Node1/Vol1, 10,545, and User ID 100 (User A)—Node 2/Vol1, 10,211. Alternatively, the entries may include more or less similar and dissimilar information than these examples.

If the quota is met or exceeded, a system rule can be executed. In one embodiment, the system rule includes access denial at operation 511A or 511B. In one embodiment, if the quota policy evaluation determines that the quota-sensitive data access request is to be denied, the quota filter rejects the quota-sensitive data access request by providing the IO data access request with some specific error code, such as EQUOTA, which means that the user has used more storage resources than allocated by the quota. The access denial may be performed according to a hard-quota definition. Alternatively, other actions may be configured in operation 511A or 511B, such as generating and/or sending an alert or warning, such as defined by a soft-quota definition.

If it is determined that quota is not met or exceeded by the current IO data access request (or if the received data access request is not a quota-sensitive data access request), the IO request is forwarded to the file system at operation 512A or 512B. The file system layer 21 receives the incoming requests, processes the requests, sends the request to the storage access layer 24 and storage drivers 25 for processing, and upon receiving the results from the storage access layer 24 and storage drivers 25, the file system layer 21 processes the results by packaging the result into the response data, and forwards the response data on the return path to the quota filter 41 at operation 514A or 514B.

Based on the data access request result of a successful data access request, the quota filter 41 updates the quota database 42, operation 515A and 515B. In order to speed up the update process, in one embodiment, the updates are performed asynchronously. In another embodiment, the other nodes have a cached copy of a portion of the database, such as by a valid ticket, and a refresh on this particular node notifies the ticket holder on the other nodes for the given portion that is being updated.

It should be noted that the operations described above, as designated by A and B in the reference labels, are performed on the respective nodes. Each node receives IO data access requests that are monitored by the quota filter on the respective node, and based on receiving quota-sensitive data access requests, the above-described operations are performed separately on each node 2A and 2B. The quota database manager 2C allows the total usage to be tracked by way of the quota filter 41 on each of node 2A and 2B, and allows the total usage to be compared against a quota stored on in the quota database to limit the user to the quota defined for multiple volumes across multiple nodes. Alternatively, the quota database manager 2C can access local quota accounting 44 for each of the volumes to determine the total volume usage, and compare the total volume usage against the volume quota. As describe in more detail below, the directory usage may be tracked over multiple volumes, and a user can be limited to a directory quota over the multiple directories.

Quota System for Multiple Directories with Garbage Collection

As described above, the quota can be implemented not only over multiple volumes, but over multiple directories. In one embodiment, the quota is implemented over multiple directories with garbage collection. The multiple-directory quota with garbage collection allows a user to oversubscribe data that is allowed by the quota system by designating certain directories as garbage collectable. The directories marked as garbage collectable may have their content moved, deleted, or moved under a hierarchical storage management (HSM) scheme, according to a cleaning policy. HSM is a data storage technique, which automatically moves data between high-cost and low-cost storage media. HSM systems exist because high-speed storage devices, such as hard disk drive arrays, are more expensive (per byte stored) than slower devices, such as optical discs and magnetic tape drives.

In one embodiment, a quota filter, such as the quota filter 41, is configured to intercept file/directory/data updates that affect the storage resources regarding a directory quota, to calculate the directory quota, and to compare the updates that affect the quota (e.g., directory quota of a directory tree) against a quota accounting system. If the request oversubscribes the quota, then the request generates a warning that the user is approaching or exceeding the quota, or alternatively, denies access. However, for requests going to a garbage collectable directory, quota is not changed. It should be noted that a quota for multiple directories may be set up in different volumes on a single node, or alternatively, across multiple volumes of multiple nodes.

One conventional system, allows users to create directories or file as elastic files that are deleted according to certain cleaning policies. Another conventional system supports data and file quota on a single directory. However, the embodiments described herein differ from the conventional systems in that, instead of just deleting garbage collectable files, multiple methods may be used to relieve storage constraints using the garbage collection as described herein. For example, data is moved into a directory that is designated as garbage collectable, and a symbolic link is placed on the data. The data is moved, much like in a HSM scheme. In addition, the embodiments described herein are implemented over multiple directories over multiple volumes on a single node, or across multiple nodes, and not just a single directory on a single node. The quota filter may also be a pluggable filter. In one embodiment, the quota filter is a protocol-level quota filter that sits between the multi-protocol engine 22A (e.g., CIFS, or NFS server) and the file system layer 21. The file system interception point may be selected, or even dynamically selected, according to the design goals, product types, and quota policies. In another embodiment, the quota filter can be implemented in the client protocol handling layer, in the file system message handling layer, or the like.

An administrator can set up a quota that includes multiple directories (e.g., directory set) residing in different volumes in a single node. Alternatively, the administrator can set up a quota that includes multiple directories residing in different volumes across multiple nodes. The quota may cover both block allocation and inode number allocation. Any changes in these regards may result into a quota check for directories covered by the directory quota (e.g., the number of directories allowed for a particular user). It should be noted that in one embodiment, one directory may be part of multiple-directory quotas.

In one embodiment, some directories are marked as garbage collectable by creating a file called "..garbage." Files under garbage collectable directories are not charged to the user's directory quota. Files under these directories can be deleted, moved away through symbolic links, or moved by other processes, such as according to a HSM scheme. A directory query does not expose "..garbage" after being set, but the user can perform a lookup against this file directory to see if the directory is marked as garbage collectable. This may be used, for example, if a certain directory is being used to hold temporary files.

In one embodiment, the logical data flow for implementing directory set quota includes the administrator setting up a directory quota for a user A for a set of directories. For example, the directory quota may be for a first directory of volume 6A and a second directory of volume 6A. In another example, the directory quota may be a first directory of volume 6A on node 2A and second directory of volume 6B on node 2B. Alternatively, other configurations are possible for the directory quota over multiple directories on similar or dissimilar volumes residing on a single node or across multiple nodes. In one embodiment, the node is a storage server. Alternatively, the node is another type of server, such as a client-based server.

Figure 6:
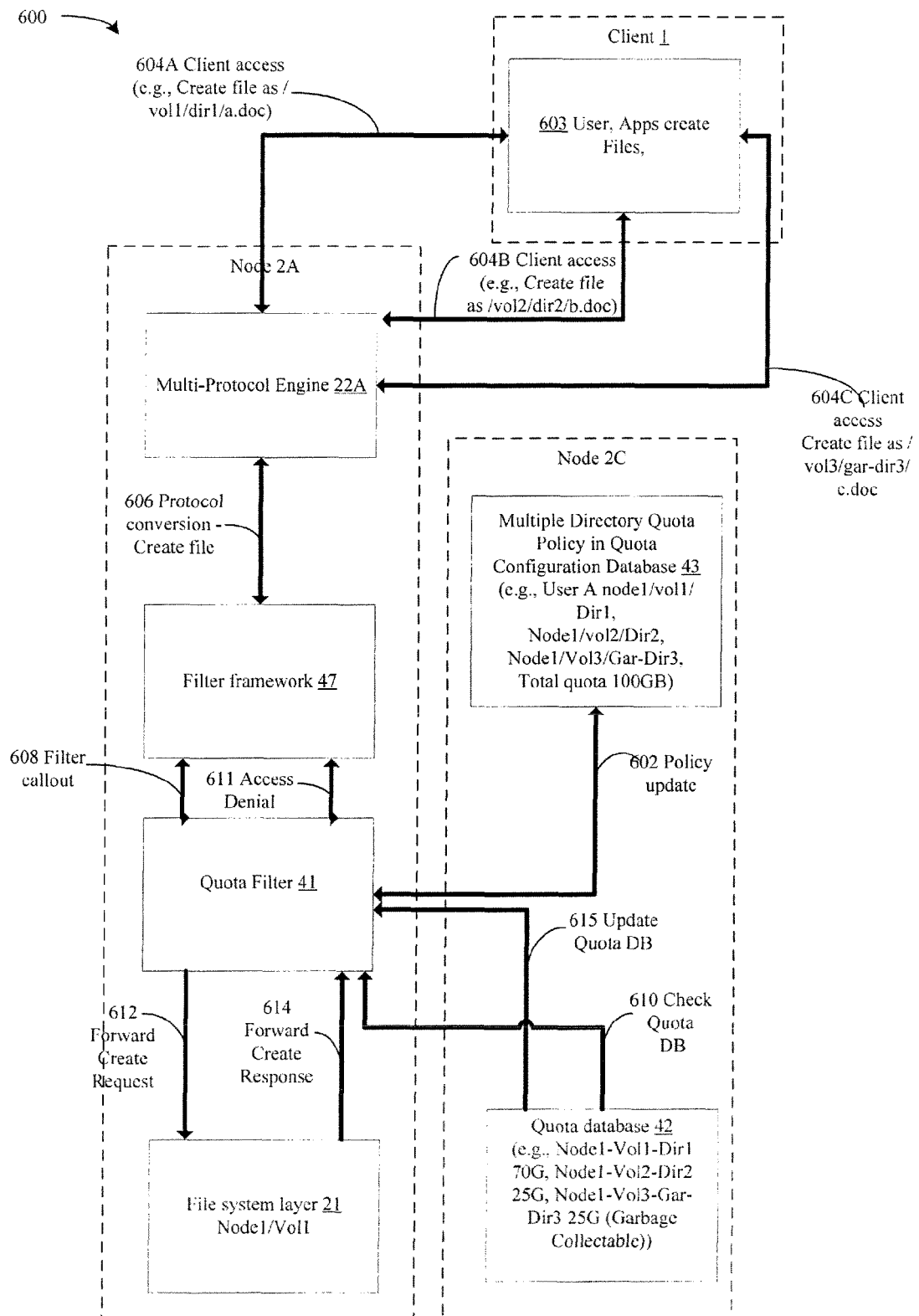
FIG. 6 illustrates one embodiment of a flow chart of a method of a create file data access request processed by a storage system implementing a multiple-directory quota system having garbage collection.

FIG. 6 illustrates one embodiment of a flow chart of a method 600 of a create file data access request processed by a storage system implementing a multiple-directory quota system having garbage collection. As part of the method 600, a multiple-directory quota policy can be created and stored in the quota configuration database 43 of the quota database manager 2C. In particular, as described above the quota configuration database 43 may store a quota policy, which includes a quota definition that defines the quota for a particular user to storage resources of the storage system. The quota definition may include policy parameters, such as a user entity, such as an individual user or a group of users, a data entity, such as a node, a node and volume, a cluster, or a node, volume, and directory, and a quota, such as a specified amount of storage units for the particular user (or group). In this particular embodiment, the data entity is a directory set having multiple directories. The directory quota may be specified by the number of directories. For example, user A can have a total quota of 100 GB in the directory set (e.g., 100 GB in node1/vol1/dir1 and node1/vol1/dir2) and one directory designated as a garbage collection (e.g., node1/vol1/Gar/dir3). Alternatively, the directory set may include directories on multiple volumes (e.g., node1/vol1/dir1 and node1/vol2/dir2) and a garbage collection directory in a similar or dissimilar volume (e.g., node1/vol3/Gar/Dir3). Alternatively, the multiple-directory quota policy may include other limits in different or similar configurations.

In another embodiment, the multiple-directory quota policy has already been created and the administrator modifies the multiple-directory quota policy to set the quota for the particular user and/or group of users.

Once the multiple-directory quota policy has been created or modified and stored in the quota configuration database 43, the multiple-directory quota policy is updated in the quota filter 41 of node 2A, operation 602. In another embodiment, multiple quota filters 41 are implemented on multiple nodes, and the multiple-directory quota policy is updated in the quota filter of each of the nodes. A user-level program may load the configuration and send it to the quota filters 41, for example, by a user-to-kernel level communication, such as through, for example, shared memory, driver system call (e.g., IO control (IOCTL) call), TCP socket call, remote procedure call (RPC), or the like.

Once the quota filter(s) 41 have been updated with the quota policy, a user or an application from a client may attempt to perform a user-application operation, such as create file, or the like, which requires a client to access data (e.g., files) stored in the storage system at operation 603. In this embodiment, the storage system includes node 2A, as well as node 2C, which includes the quota database. As described above, the node 2A includes a multi-protocol engine 22A that services client accesses 604A, 604B, or 604C. The multi-protocol engine 22A receives client accesses 604A, 604B, and 604C, and in response performs protocol conversions of the client access corresponding to the create file data access request in operation 606. In one embodiment, the client access 604A includes a data access request of creating a file (e.g., create a file as vol1/dir1/a.doc), the client access 604B includes a data access request of creating a file (e.g., create a file as vol2/dir2/b.doc), and the client access 604c includes a data access request of creating a file (e.g., create a file as vol3/gar-dir3/c.doc). The client accesses 604A-604C may be NFS or CIFS protocol requests, such as IO data access requests (e.g., create file request) received over an Ethernet port or other types of network ports. The client sends the IO data access request to the multi-protocol engine 22A according to the individual protocol specification. It should be noted that although the client access is described as being performed remotely over a network, alternatively, access can also be done locally.

As described above, in operation 605, the multi-protocol engine 22A receives the IO request from the client, parses the IO request, converts the request into a system internal request, and forwards the request to the filter framework 47 at operation 606. On the return path, the multi-protocol engine 22A converts the internal response to IO response via the designated protocol. The filter framework 47 receives the internal request from the protocol conversion. The filter framework 47 decides which call model is to be used. The call model may be synchronous, asynchronous, or sniff mode, as described above. Also, the quota filter in these embodiments can be cascaded, implemented in the kernel space, or in the user space as described above with respect to embodiments of the multiple volume quota system.

Similarly, as described above, the filter framework 47 enumerates quota filters and makes callouts one by one in operation 608. The filter framework 47 uses incoming requests, and forwards the incoming requests to each of the filter's requested callback. In the return path, the filter framework 47 receives filter's response data, enumerates filters, and invokes filter's response callback in operation 611. For example, as described below, the response data may indicate that the data access request should be denied because it violates the quota. Alternatively, the response data may indicate other operations.

The quota filter 41 on node 2A may be configured to perform various operations. The quota filter 41 is configured to monitor and detect quota-sensitive data access requests based on the quota policy configured in operation 602. For example, user A has a quota of 100 GB on the directory set, such as directory 1-3 on multiple volumes of one or more nodes. If the data access request is not quota sensitive, the method moves to operation 612 to forward the request to the file system. Also, if the given directory is underneath a garbage collected directory, flow moves to operation 612 to forward the request to the file system.

For quota accounting on the storage system, the multiple-directory quota may be based on client entity, such as a user, or a group of users, and the target entity, such as a volume, directory, node, or cluster. Alternatively, the multiple-directory quota may be based on client entity, and it may be assumed that directory set is on a single node. The total quota may be a number that reflects the total block consumption or inode consumption based on the client and/or target entity. The quota database 42 can be implemented on a node-independent accounting database, such as the quota database manager 2C. Alternatively, the quota database 42 may be implemented on one of the nodes of the storage system. The quota database 42 is used to store information for the global quota (e.g., total usage and total quota). Also, information regarding the client entity, the total usage, the quota type, the target entity may be stored in the quota database 42. It should be noted that not all accesses need to be counted. In one embodiment, only the accesses based on all the access policies can be counted, and if policies change, then new counting can be enabled, while other counting will not be continued, as described above.

In operation 610, the module calculates results for multiple policies by checking the total usage of storage resources by the user in the quota database 42. For example, in an embodiment of a create file data access request, the quota filter 41 checks the quota database 42, which is aware of the quota over multiple nodes across multiple nodes, to see if intended write data access request would meet or exceed the quota, such as the soft or hard quota. Since the directory quota can be implemented on multiple directories, the number of directories of each individual directory does not need be determined, but only that the total number of directories is not over the limit. The data access request of creating a new file can be denied if the total number of files associated to the user or user group is over the hard limit. Alternatively, the data access request of creating a new file can be denied if the total number of directories is over the hard limit. In another embodiment, a quota policy is defined to set a limit on the total number of files in multiple directories.

When a create file data access request is performed successfully, the total number of directories or the total number of files are incremented. Each successful new entry of file or directory will increment total, whereas a failed data access request or denied data access request doesn't change the quota entry.

In another embodiment for creating a new entry, the quota filter 41 checks the quota database 42 to see if the intended write would meet or exceed the directory quota (e.g., hard or soft). In one embodiment, a cached copy, such as a read-only copy, of all or a portion of the quota database is stored locally on the storage server to facilitate access on the respective nodes. In another embodiment, a ticket is used to decide how long to keep the cached copy on the respective node.

In another embodiment of creating a new file, the data access request of creating a new file can be denied if the total number of files associated with the user is over the hard limit. Since quota can span over multiple directories, in one embodiment, the storage system does not limit the amount of data stored on a particular directory, but only the total directory usage on the storage system. Alternatively, the storage system may limit the total directory usage for each directory, as well as the amount of directory usage on a particular node or volume. In another embodiment, the directory quota policy can be set up to limit the total number of files in one or more directories on one or more nodes.

In one embodiment, the quota filter 41 does not check or update the directory quota. However, for appending existing blocks or new writes, the quota database is checked so that the append or new write data access request does not meet or exceed the quota. It should be noted that normally one append data access request affects only one volume. In another embodiment for a truncation request, the quota filter does not do a quota check, but needs to update the result of the truncation request. Similarly, in another embodiment of a partial write data access request, the quota filter only updates the actual addition of the write. In another embodiment of a striped write, the quota filter when implemented below the striped write logic, only receives writes intended to the volume that the quota filter covers. If the quota filter sees a striped write, the quota filter needs to only check and update the portion of the volume that the striped write affects.

As described above, the quota database 42 stores quota entries. For example, an entry may be based on the block consumption for the user, such as User ID 100 (User A)—Node1/Vol1/Dir1 70 GB, and User ID 100 (User A)—Node2/Vol1/Dir2 25 GB. The entry may also be based on the inode consumption for the user, such as User ID 100 (User A)—Node1/Vol1/Dir1, 10,545, and User ID 100 (User A)—Node 2/Vol1/Dir1, 10,211. Alternatively, the entries may include more or less similar and dissimilar information than these examples.

If the quota is met or exceeded, a system rule can be executed. In one embodiment, the system rule includes access denial at operation 611. In one embodiment, if the directory quota policy evaluation determines that the quota-sensitive data access request is to be denied, the quota filter rejects the quota-sensitive data access request by providing the IO data access request with some specific error code, such as EQUOTA, which means that the user has used more storage resources than allocated by the quota. The access denial may be performed according to a hard-quota definition. Alternatively, other actions may be configured in operation 611, such as generating and/or sending an alert or warning, such as defined by a soft-quota definition.

If it is determined that quota is not met or exceeded by the current IO data access request (or if the received data access request is not a quota-sensitive data access request), the IO request is forwarded to the file system at operation 612. The file system layer 21 receives the incoming requests, processes the requests, sends the request to the storage access layer 24 and the storage drivers 25 for processing, and upon receiving the results from the storage access layer 24 and the storage drivers 25, the file system layer 21 processes the results by packaging the result into the response data, and forwards the response data on the return path to the quota filter 41 at operation 614.

Based on the data access request result of a successful data access request, the quota filter 41 updates the quota database 42, operation 615. For example, the quota database 42 is updated for file changes, increasing or decreasing the number of files affected in the directory set. Alternatively, the quota database 42 is updated for block changes, increasing or decreasing the number of blocks affected the directory set. In order to speed up the update process, in one embodiment, the updates is performed asynchronously. In another embodiment, the other nodes have a cached copy of a portion of the database, such as by a valid ticket, and a refresh on this particular node notifies the ticket holder on the other nodes for the given portion that is being updated. The cached copy may be used to facilitate an expedited lookup operation for subsequent lookup operations to the quota database 42 or the quota configuration database 43 to determine whether the quota has been violated or not for the particular data access request. In one embodiment, no update is performed for data access requests to a directory that is designated with garbage collection.

In one embodiment, the storage system includes a file system quota filter 41, file system filter framework 47, a quota configuration database 43, and a quota database 42 in a quota database manager, and a garbage collector (not illustrated in FIG. 4). The garbage collector is configured to move some files from certain directories to other places to reduce the space usage for the given user. The quota filter 41 gives the user some extra space by using the garbage collector to reduce the usage for the given user. The garbage collector may be implemented separately, or in connection with, the quota policy. The garbage collector connects to one or more quota filters 41 and the quota database manager 2C.

It should be noted that although the embodiments of FIG. 6 are illustrated and described as implementing a directory quota over multiple directories in a single node, the embodiments described herein may be implemented in multiple nodes.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like).

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in alternative orders or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    monitoring, by a quota filter executing on a storage server, input-output (IO) data access requests, received at the storage server of a plurality of storage servers clustered in a data storage system, for a quota-sensitive data access request;
    requesting, by the quota filter, a total usage of storage resources for a user across the plurality of storage servers, wherein said requesting comprises
    performing a lookup in a local quota database that stores the total usage of storage resources for the user and a quota limit of an amount of storage resources allocated to the user, wherein the local quota database is a cached copy of at least a portion of a remote quota database that stores amounts of storage resources and quota limits of amounts of storage resources allocated to a plurality of users across the plurality of storage servers clustered in the data storage system, and wherein the remote quota database tracks amounts of storage resources used by the plurality of users across the plurality of storage servers clustered in the data storage system; and limiting the user to the quota limit of storage resources across the plurality of storage servers based on the total usage of storage resources, wherein said limiting comprises determining, by the quota filter, that the quota-sensitive data access request would make the total usage of storage resources exceed the quota limit for the user, and allowing the user to exceed the quota limit by storing data in a directory designated as garbage collectable, wherein the data in the garbage collectable directory is moved or deleted according to a cleaning policy or moved between a high cost storage medium and a low cost storage medium under a hierarchical storage management scheme.

2. The method of claim 1, wherein limiting the user comprises limiting the user to the quota limit based on at least one of a volume set of a plurality of volumes of the storage system, or a directory set of a plurality of directories of the storage system.

3. The method of claim 2, wherein limiting the user to the quota limit based on the directory set comprises designating a directory as garbage collectable, and wherein the method further comprises:

performing an operation on the directory designated as garbage collectable according to the cleaning policy.

4. A storage server of a cluster of storage servers in a data storage system, comprising:

a processor;

a first communication interface through which to communicate with a quota manager that manages a total usage of storage resources by a user across a plurality of storage servers using a remote quota database, wherein the remote quota database stores amounts of storage resources and quota limits for a plurality of users across the plurality of storage servers clustered in the data storage system;

a second communication interface through which to communicate with a client processing system coupled to the storage server;

a third communication interface through which to communicate with a plurality of storage devices; and a memory storing instructions which configured the processor to execute a quota filter to limit a user to a quota limit of storage resources in the data storage system wherein the quota filter is configured to perform the following operations:

monitoring input-output (IO) data access requests received at the storage server from the client to check for a quota-sensitive data access request;

performing a lookup in a local quota database that stores a total usage of storage resources for the user across the plurality of storage server and the quota limit of an amount of storage resources allocated to the user, wherein the local quota database is a cached copy of at least a portion of the remote quota database;

determining that the quota-sensitive data access request would make the total usage of storage resources exceed the quota limit for the user; and allowing the user to exceed the quota limit by storing data in a directory designated as garbage collectable, wherein the data in the garbage collectable directory is moved or deleted according to a cleaning policy or moved between a high cost storage medium and a low cost storage medium under a hierarchical storage management scheme.

5. The storage server of claim 4, further comprising:

determining a local usage of storage resources on the storage server by the user;

sending the local usage of storage resources to the quota manager.

6. The storage server of claim 4, wherein the quota-sensitive data access request comprises at least one of creating a new file, deleting an existing file, or writing to an existing file to append the data of the existing file.

7. The storage server of claim 4, wherein the quota filter is a protocol layer filter.

8. The storage server of claim 4, further comprising additional instructions which configured the processor to perform the following:

deleting the directory designated as garbage collectable according to the cleaning policy.

9. A method, comprising:

setting a quota policy for a user for a set of logical data containers across a plurality of storage servers clustered in a data storage system;

storing the quota policy in a first quota data store that stores quota limits for a plurality of users across the plurality of storage servers clustered in the data storage system, wherein each quota limit is an amount of storage resources allocated to each user;

maintaining a total usage of storage resources by the user in a second quota data store, which is accessible by each of the plurality of storage servers, wherein the second quota data store stores amounts of storage resources used by the plurality of users across the plurality of storage servers clustered in the data storage system;

receiving information regarding a quota-sensitive data access request received at a quota filter executing on a particular storage server of the plurality of storage servers;

performing, by the quota filter, a lookup in a local, cached copy of at least a portion of the second data store to determine a total amount of resources used by the user across the plurality of storage servers clustered in the data storage system, wherein the local, cached copy is stored in the particular storage server;

calculating, by the quota filter, affected storage resources based on the received information and the total amount of resources used by the user;

comparing, by the quota filter, the affected storage resources against the quota policy; and allowing the user to exceed the quota limit by storing data in a directory designated as garbage collectable, wherein the data in the garbage collectable directory is moved or deleted according to a cleaning policy or moved between a high cost storage medium and a low cost storage medium under a hierarchical storage management scheme.

10. The method of claim 9, wherein the quota policy comprises at least one of a block quota, a storage server quota, a file quota, or an inode quota.

11. The method of claim 9, wherein said initiating execution of the system rule comprises sending a command to execute the system rule that denies the quota-sensitive data access request that would cause the quota policy to be violated.

12. A quota management system, comprising:
a computing device having multiple communication interfaces, wherein each communication interface communicates with corresponding ones of a plurality of storage servers clustered in a data storage system, wherein the computing device comprises
a quota data store for maintaining a total usage of storage resources by a user across the plurality of storage servers clustered in the data storage system and a quota limit of an amount of storage resources allocated to the user; and
a quota manager, executing on the computing device, configured to receive from a quota filter executing on a particular storage server information regarding a quota-sensitive data access request directed to the particular storage server; and
the plurality of storage servers clustered in the data storage system each communicatively coupled to the quota management system, wherein at least one of the plurality of storage servers executes the quota filter configured to perform the following operations:
monitoring input-output (IO) data access requests received at the particular storage server from a client processing system to detect the quota-sensitive data access request;
performing a lookup in a local, cached copy of at least a portion of the quota data store to determine the total usage of storage resources for the user and the quota limit allocated to the user;
determining that the quota-sensitive data access request would make the total usage of storage resources exceed the quota limit for the user; and
allowing the user to exceed the quota limit by storing data in a directory designated as garbage collectable, wherein the data in the garbage collectable directory is moved or deleted according to a cleaning policy or moved between a high cost storage medium and a low cost storage medium under a hierarchical storage management scheme.

13. The quota management system of claim 12, wherein the quota manager is configured to maintain the total usage by determining local usage of storage resources by the user on each of the plurality of storage servers, and summing the local usage on the plurality of storage servers to determine the total usage of storage resources by the user.

14. The quota management system of claim 13, wherein the quota manager determines the local usage by accessing a local accounting data store corresponding to a logical data container on each of the plurality of storage servers.

15. The quota management system of claim 12, wherein the quota manager maintains the total usage of storage resources over a logical data container set, including a plurality of logical data containers across the plurality of storage servers.

16. The quota management system of claim 15, wherein the logical data container set is at least one of a volume set having multiple volumes across the plurality of storage servers or a directory set having multiple directories across the plurality of storage servers.

17. The quota management system of claim 15, wherein each of the logical data containers corresponds to a file system and comprises local volume accounting, and wherein the quota manager is configured to use the local volume accounting to determine the total usage of storage resources for the user across the plurality of storage servers.

* * * * *